US007103202B2

(12) United States Patent
Bruijns

(10) Patent No.: US 7,103,202 B2
(45) Date of Patent: Sep. 5, 2006

(54) METHOD OF ANALYZING A DATA SET COMPRISING A TUBULAR STRUCTURE

(75) Inventor: Johannes Bruijns, Eindhoven (NL)

(73) Assignee: Koninklijke Philips Electronics, N.V., Eindhoven (NL)

(*) Notice: Subject to any disclaimer, the term of this patent is extended or adjusted under 35 U.S.C. 154(b) by 360 days.

(21) Appl. No.: 10/023,166

(22) Filed: Dec. 18, 2001

(65) Prior Publication Data

US 2005/0089245 A1  Apr. 28, 2005

(30) Foreign Application Priority Data

Dec. 21, 2000  (EP) .................................. 00204721

(51) Int. Cl.
*G06K 9/00* (2006.01)
*G06K 9/48* (2006.01)

(52) U.S. Cl. ..................... 382/128; 382/154; 382/199

(58) Field of Classification Search ................ 382/100, 382/107, 108, 128, 130–131, 133, 134, 154, 382/173, 199, 285, 286, 288; 348/65, 67
See application file for complete search history.

(56) References Cited

U.S. PATENT DOCUMENTS

| 4,710,876 A | * | 12/1987 | Cline et al. .................. 345/423 |
| 5,825,908 A | * | 10/1998 | Pieper et al. ................ 382/131 |
| 6,048,314 A | * | 4/2000 | Nikom ........................ 600/443 |

FOREIGN PATENT DOCUMENTS

WO  WO 9857301  * 12/1998

OTHER PUBLICATIONS

Lorensen et al. ("Marching Cubes: A High Resolution #D Surface Construction Algorithm", Computer Graphics, vol. 21, No. 4, Jul. 1987.*
Sonka et al: "Adaptive Approach To Accurate Analysis Of Small-Diameter Vessels Incineangiograms" IEEE Transactions On Medical Imaging, IEEE Inc. New York, US, vol. 16, No. 1, Feb. 1, 1997, pp. 87-95.
Jeon et al: "A new approach to the estimation of diameters in coronary arteriograms" Real-Time Imaging, Academic Press Limited, GB, vol. 4, No. 6, Dec. 1998, pp. 443-454.
U.S. Appl. No. 09/857,266, filed Jun. 1, 2001, Inventors: Johannes Bruijns. Title: Analysis of an Object Data Set on a Multi-Dimensional Space. Assigned to US Philips Corp.

* cited by examiner

*Primary Examiner*—Duy M. Dang

(57) ABSTRACT

The invention relates to a method and computer readable medium for analyzing an object data set that includes points in a multi-dimensional space and in which a tubular structure occurs. The method includes determining a number of points forming part of the surface of the tubular structure in the vicinity of a selected position, and calculating a gradient to the surface for each of the points. The method further includes using the selection of points to calculate an orientation for a cutting plane such that the direction thereof is as parallel as possible to the longitudinal axis of the tubular structure at the selected position.

4 Claims, 2 Drawing Sheets

METHOD OF ANALYZING A DATA SET COMPRISING A TUBULAR STRUCTURE

Figure 1:
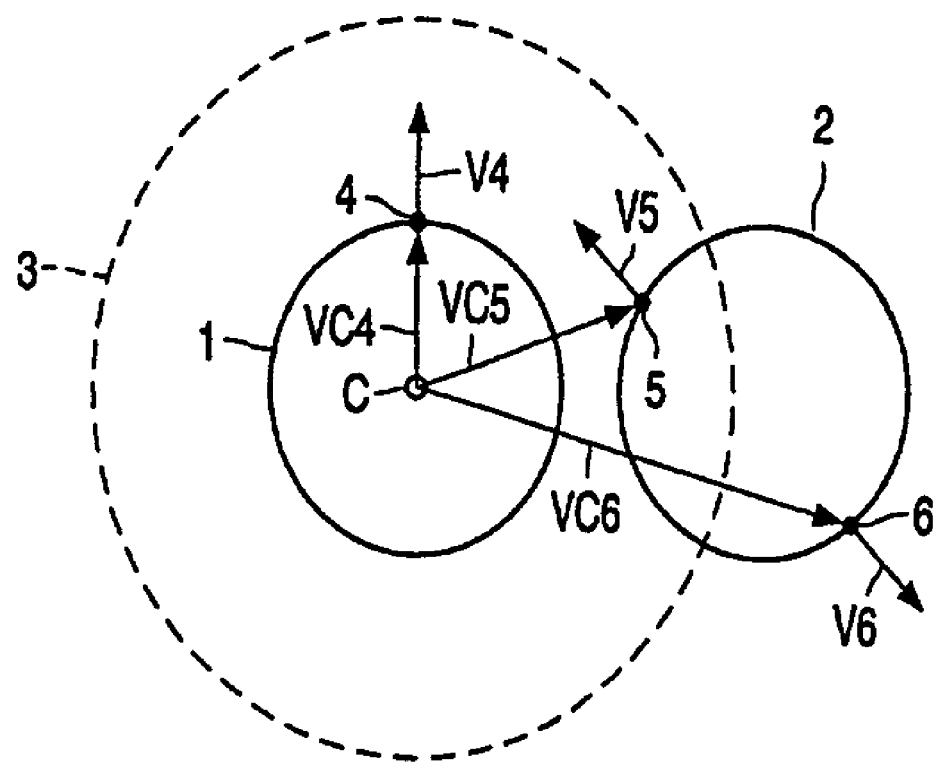

The present invention relates to a method of analyzing an object data set that comprises points in a multi-dimensional space and, in which a tubular structure occurs, method comprising the following steps:

a. choosing a starting position in or near the tubular structure;
b. deriving a cutting plane through the tubular structure at the starting position,
c. determining a number of points forming part of the surface of the tubular structure in the vicinity of the starting position; and
d. calculating a gradient to the surface for each of the points.

The international patent application PCT/EP00/09505 (WO01/26055 A2). published 12 Apr. 2001. relates to a method of the type mentioned above. This method generally relates to the analysis of a tubular structure in a multi-dimensional space. According to the method described in the cited international patent application EP00/09505 a self-adjusting probe is defined for analysis of the object data set. The self-adjusting probe comprises a sphere and a plane through the center of the sphere. The sphere should be positioned such that the tubular structure at least partially intersects the sphere. The plane should be oriented so as to be orthogonal to the tubular structure. When oriented correctly, the self-adjusting probe enables semi-automatic shape extraction of tube-like geometry.

Such an object data set represents one or more properties of the object to be examined. The object data set notably relates to the density distribution in the object to be examined; in that case the data values are the local density values of (a part of) the object to be examined. The data values may also relate, for example, to the distribution of the temperature or the magnetization in the object. The multi-dimensional space is usually the three-dimensional space. The data values then relate to a volume distribution of the relevant property, for example, the density distribution in a volume of the object to be examined. The multi-dimensional space may also be two-dimensional. In that case the data values relate to a distribution of the relevant property in a plane through the object, for example the density distribution in a cross-section through the object.

The object data set can be acquired in a variety of ways. The object data set notably relates to a patient to be examined. Such an object data set can be acquired by means of various techniques such as 3D X-ray rotational angiography, computed tomography, magnetic resonance imaging or magnetic resonance angiography.

The method described in the cited international patent application EP00/09505 is particularly suitable for analyzing the structure of a blood vessel. Several physical characteristics of the blood vessel can be determined, such as the diameter thereof, which are crucial for diagnosis and a safe treatment of, for example, a stenosis or an aneurysm.

Currently the calculation of the above mentioned important step of orienting the cutting plane is based on a selection of surface points lying inside the sphere at a small distance from the plane. This is described in the article "Semi-Automatic Shape Extraction from Tube-like Geometry" by J. Bruijns, published in B. Girod, G. Greiner, H. Niemann, H.-P. Seidel (Eds.), Vision Modelling and Visualization 2000, Proceedings, Nov. 22–24, 2000, Saarbruecken. In the example described in the cited article the surface of a blood vessel is represented by means of triangles (a known method which will be explained later). However, the known selection of surface points is rather arbitrary and may unintentionally include points associated with neighboring vessels. This directly leads to inaccuracies in the determination of the physical characteristics of the blood vessel under analysis.

The invention aims to provide a method of the type mentioned above which allows for more accurate calculation of the physical characteristics of the tubular structure under analysis.

To this end, the method according to the invention also comprises the characterizing steps of:

e) determining for each point a vector from the center of the tubular structure to the point;
f) determining the angle between the vector and the gradient at the point;
g) adding the point to a selection of points if the angle is equal to or smaller than a predetermined ceiling value;
h) using the selection of points to calculate an orientation for the cutting plane such that the direction thereof is as parallel as possible to the longitudinal axis of the tubular structure at the starting position, and
i) repeating the steps a) through h) for a new starting position along the tubular structure if necessary.

A preferred version of the method also comprises the steps of: defining a sphere which is at least partially intersected by the tubular structure, and performing the steps e) through g) only for surface points lying inside the sphere. When the radius of the sphere is chosen wisely, for example, slightly larger than the expected radius of the tubular structure under analysis, points within the sphere most likely belong to the tubular structure whereas points outside the sphere probably do not. Furthermore, the reduction of the number of points taken into account during the calculation also increases the calculation speed.

In a further preferred version the steps e) through g) of the method are performed only for points lying at a predetermined maximum distance from the cutting plane. This allows for a further advantageous reduction of the number of points involved in the calculation thus further increasing the calculation speed.

The invention also relates to a computer program for carrying out the method according to the invention.

Figure 2:
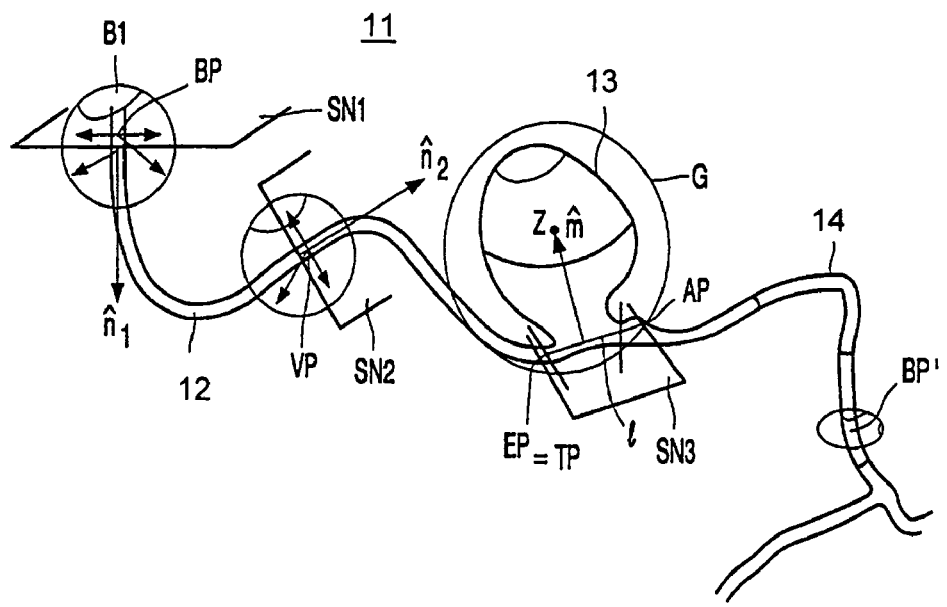
Figure 3:
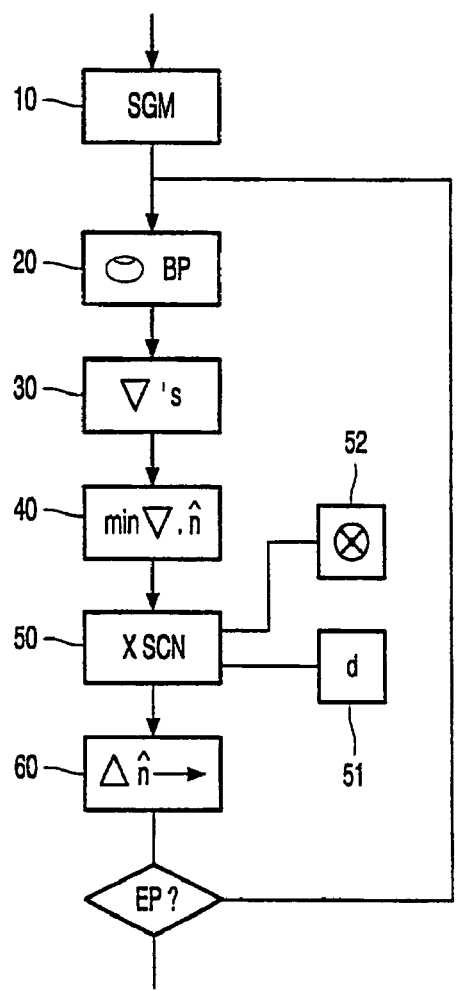

The invention is described in illustrative detail hereinafter with reference to the attached drawings, in which:

FIG. 1 shows a cross section through two adjacent tubular structures under analysis by way of the method according to an aspect the invention, FIG. 2 shows an example of an object data set with a tubular structure in which an illustrative aspect of the invention is indicated, and FIG. 3 shows an example of a flow chart of a method according to an aspect of the present invention.

FIG. 1 shows a cross section through two adjacent tubular structures that is, vessels 1 and 2. Asphere 3 is defined around the vessel 1. The center of the sphere 3 and the vessel 1 coincide and is indicated as c. The sphere 3 also partly intersects the vessel 2.

The preferred version of the method according to the invention comprises the following steps. First a starting position is chosen in or near the tubular structure and a cutting plane is derived through the tubular structure at the starting position. These steps are also described in the international patent application EP00/09505 which document is incorporated completely herein by way of reference.

FIG. 2 shows an example of an object data set containing a tubular structure according to an aspect of the invention, and notably shows a tubular structure. in this case a rendition of a part of the vascular system of the patient to be examined, which has already been segmented from the possibly larger object data set. This is represented by step 10 in FIG. 3. The segmentation consists, for example, in that all data values are set to a fixed value in positions in which the original object data set contains data values outside the selected range. The vascular system includes an aneurysm 13, which acts as a reservoir, a blood vessel 12 that transports blood to the aneurysm 13 and a blood vessel 14 via which blood is discharged from the aneurysm 13. The blood vessels 12 and 14 thus act as an inlet duct and an outlet duct. The starting point (BP) is selected by the user, for example by pointing it out on the display screen of a workstation by means of a mouse and/or a keyboard and a curser. Around the starting point BP there is taken a sphere (B1) as indicated in step 20. The gradients ($g_{1j}$) of the data values are calculated at points on the edge of the tubular structure in the sphere B1; this is indicated in step 30. More explicitly the gradients are calculated as follows:

$$g_{1j} = \begin{pmatrix} \frac{\partial D}{\partial x_j} \\ \frac{\partial D}{\partial y_j} \\ \frac{\partial D}{\partial z_j} \end{pmatrix},$$

where $(x_j, y_j, z_j)$ is the position at issue at the surface of the tubular structure and D indicates the data-values of the data-set which represents. for example, the pixel-values or the voxel-values of the object to be examined. Consequently, the vector $g_{1j}$ points transverse to the surface of the tubular structure. Subsequently, in step 40. the normal vector $\hat{n}_1$ is calculated by means of a minimization process, so that the sum $\Sigma_j W_j(\hat{n}_1^{y*}g_{1j})^2$ is minimum. The weight factors $w_1$ are to be adjusted by the user; preferably, the weight factors decrease as the distance between the position in which the gradient $g_{1j}$ is calculated and the starting point BP is larger. The cutting plane SN1 has a normal vector $\hat{n}_1$ and extends through the starting point BP. The cross-section through the tubular structure 11 along the cutting plane SN1 is taken in step 50. In step 51 the local diameter d of the tubular structure 11, i.e. of the blood vessel, is derived from this cross-section. Furthermore, in step 52 the local center position of the tubular structure 11 is preferably derived from the cross-section as described in the international patent application EP00/09505.

In order to track the tubular structure as from the starting point BP, in step 60 the subseQuent position (VP) is derived in the direction of the normal vector $\hat{n}_1$, which is locally oriented accurately along the axis of the blood vessel. The magnitude of the shift is adjusted by the user in dependence on the degree of meandering of the tubular structure. FIG. 2 shows a subsequent position VP that is reached after a large number of shifts along the axis of the blood vessel 12. When the subsequent position is not yet the end position (EP) desired by the user, the steps 20, 30, 40, 50, 51, 52 and 60 are repeated. Thus, the axis along the blood vessel and the diameter along the axis may thus be determined.

For example, the end point EP is the inlet point (TP) from the blood vessel 12 to the aneurysm 13. The outlet point (AP) is reached by tracking the blood vessel from a different starting point (BP') on the blood vessel 14 by means of the procedure show via FIG. 3. For example, the user can terminate the tracking of the blood vessel when, on the basis of the anatomical insight of the user, the inlet point or outlet point has been reached. It is also possible to terminate the tracking of the blood vessel when the local diameter of the blood vessel suddenly increases strongly. A connecting line is drawn through the inlet point and the outlet point (TP. AP). Furthermore, the central position (Z) of the aneurysm 13 is calculated as the center of gravity on the basis of the data values in the region (G). The region G is, for example, a sphere around the aneurysm 13. it has been found that suitable results are achieved for the center position Z when it is ensured that the region G does not include too many points in the segmented data set that lie outside the aneurysm. The normal vector $\hat{m}_1$. It appears that this cutting plane (SN3) accurately separates the inlet and outlet ducts, in this case being the blood vessels 12 and 14, from the aneurysm 13.

With reference again to FIG. 1, a number of points that form part of the surface of the tubular structure are defined in the vicinity of the starting position. In order to illustrate this step three points (also referred to as vertices) on the surfaces of the vessels are indicated. Point 4 is a surface point on the vessel 1. Points 5 and 6 are surface points on the vessel 2. In the relevant art several methods are known to define the surface of a vessel in an object data set. When the object data set comprises a volumetric representation of the object by means of voxels, the surface of the vessel is defined by a set of boundary vessel voxels. This voxel set can be determined by first separating the vessel voxels from the tissue voxels by means of known techniques such as a 'region growing algorithm'. Next it is determined which of the vessel voxels lie adjacent to tissue voxels. Such voxels are referred to as boundary vessel voxels. Preferably this determination is performed by finding the facing neighbors, that is neighbors which have one voxel face in common. As an alternative the surface of the vessel can be represented by surface triangles which can be generated by means of the so-called marching cubes algorithm which is known in the art. The marching cubes algorithm is described, for example, in the article: "Marching Cubes: A High Resolution 3D Surface Construction Algorithm", by Lorensen and Cline, Computer Graphics, Vol. 21, No. 4, Jul. 1987.

In a next step gradient is calculated for each of the vessel surface points a gradient. This is performed by means of standard techniques, which are among others described in the international patent application EP00/09505. The resultant gradients for the points 4, 5 and 6 are indicated as v4, v5 and v6, respectively.

In order to determine which of the three points should be included in the selection of points to be used for the calculation of the desired orthogonal orientation of the cutting plane, the method comprises the following characterizing steps.

First for each point a vector is determined from the center of the tubular structure to the point. For the point 4 the vector is designated as vc4. For the point 5 the vector is designated as vc5 and for the point 6 the vector is designated as vc6.

Next for each surface point the angle is determined between each of the vectors and the gradient at the point. If the angle is equal to or smaller than a predetermined ceiling value, the surface point is added to the above-mentioned selection of surface points to be used to orient the cutting plane. A ceiling value can be set by a user or can be automatically set. It has been found from experiments that a ceiling value of between 50 and 70 degrees, for example approximately 60 degrees, gives reasonable results in the case of the current example relating to shape extraction for a blood vessel.

Returning now to FIG. 1 some calculations will be performed in order to illustrate the method according to the invention. Starting with the point 4, the angle between v4 and vc4 is zero degrees. Assume that the ceiling value is chosen to be 60 degrees. The point 4 is then added to the selection. This is rightly so, because the point 4 is a surface point on the vessel 1, that is the vessel under analysis. However the angle between v5 and vc5 is more than 90 degrees. The point 5 will therefore, be excluded from the selection under the current conditions. Again this is correct, since the point 5 is a surface point of the vessel 2, that is, the vessel neighboring the vessel investigated.

It is to be noted that the angle between v6 and vc6 appears to be smaller than 60 degrees. The point 6 would unintentionally be added to the selection, since the point 6 is a surface point of the vessel 2. This can be prevented by adding another criterion relating to the selection of vertices. A useful second criterion is that only surface points lying inside the sphere 3 should be included in the selection. From FIG. 1 it is clear that the point 6 does not meet this criterion and would, therefore not be included in the selection after all.

It is to be noted that a useful third criterion would be to perform the steps e) through g) for points lying at a predetermined maximum distance from the cutting plane. When de object data set comprises surface triangles, a ceiling value for this distance can be derived, for example, from the length of the triangle edges (see also the above mentioned article by Bruijns).

The order in which the three criteria of the method according to the invention are implemented may be varied.

The selection of surface points thus created is then used to orient the cutting plane such that the direction thereof is as parallel as possible to the longitudinal axis of the tubular structure at the starting position. An example of this calculation is described in the article mentioned above, this is document is incorporated entirely herein by way of reference. The above steps of the method according to the invention can be repeated for each new starting position along the tubular structure if necessary.

Now that the method of the invention has been explained, a skilled person will be able to translate the steps of the method into a computer program for carrying out the method.

Summarizing the invention refers to a method for analyzing an object data set in a multi-dimensional space comprising a tubular structure. This method is especially useful in the field of medical diagnostics and treatment where the object notably is a patient to be examined. All kinds of tubular structures can be analyzed, such as blood vessels, but also brain cell or neuron cell structures. In analyzing blood vessels the method according to the invention allows for accurate determination of the size and diameter of a blood vessel which is essential for correct diagnosis of, for example, a stenosis or an aneurysm and for the safe treatment thereof.

The invention is of course not limited to the version described or shown, but generally extends to any version that is within the scope of the appended claims as seen in the light of the foregoing description and drawings.

The invention claimed is:

1. A method of analyzing an object data set which comprises points in a multi-dimensional space and in which a tubular structure occurs, the method comprising the following steps:
   a) choosing a starting position in or near a tubular structure;
   b) deriving a cutting plane through the tubular structure at a starting position;
   c) determining a number of points forming part of a surface of the tubular structure in a vicinity of the starting position;
   d) calculating a gradient to the surface for each of the points;
   e) determining for each point a vector from a center of the tubular structure to the point;
   f) determining an angle between the vector and the gradient at the point;
   g) adding the point to a selection of points if the angle is equal to or smaller than a predetermined ceiling value;
   h) using the selection of points to calculate an orientation for the cutting plane such that a direction thereof is as parallel as possible to a longitudinal axis of the tubular structure at the starting positiom; and
   i) repeating the steps a) through h) for a new starting position along the tubular structure if necessary.

2. A method as claimed in claim 1, also comprising the steps of:
   defining a sphere, which is at least partially intersected by the tubular structure, and
   performing the steps e) through g) only for points lying inside the sphere.

3. A method as claimed in claim 1, wherein the steps e) through
   g) are performed only for points lying at a predetermined maximum distance from the cutting plane.

4. A computer medium for carrying out the method as claimed in claim 1.

* * * * *